United States Patent [19]

Brüggemann et al.

[11] Patent Number: 5,143,973
[45] Date of Patent: Sep. 1, 1992

[54] MOULDING COMPOSITIONS OF LOW DOUBLE REFRACTION

[75] Inventors: Horst Brüggemann, Cologne; Dieter Freitag, Krefeld; Lothar Meier, Sprockhoevel; Christian Lindner; Hans-Eberhard Braese, both of Cologne, all of Fed. Rep. of Germany

[73] Assignee: Bayer Aktiengesellschaft, Leverkusen, Fed. Rep. of Germany

[21] Appl. No.: 512,558

[22] Filed: Apr. 23, 1990

Related U.S. Application Data

[63] Continuation of Ser. No. 436,114, Nov. 13, 1989, abandoned, which is a continuation of Ser. No. 205,734, Jun. 13, 1988, abandoned.

[30] Foreign Application Priority Data

Jun. 26, 1987 [DE] Fed. Rep. of Germany ....... 3721054
Mar. 23, 1988 [DE] Fed. Rep. of Germany ....... 3809779

[51] Int. Cl.$^5$ ..................... C08L 33/08; C08L 51/04
[52] U.S. Cl. ..................... 525/85; 525/80; 525/83; 525/222
[58] Field of Search ............ 525/222, 83, 85, 80

[56] References Cited

U.S. PATENT DOCUMENTS

| | | | |
|---|---|---|---|
| 3,557,251 | 1/1971 | Tanaka et al. | 525/85 |
| 4,144,286 | 3/1979 | Casper et al. | |
| 4,201,829 | 5/1980 | Mast et al. | |
| 4,666,980 | 5/1987 | Lindner et al. | |

FOREIGN PATENT DOCUMENTS 173812 11/1986 European Pat. Off.
0218276 4/1987 European Pat. Off.
2345485 10/1977 France.

Primary Examiner—Jacob Ziegler
Attorney, Agent, or Firm—Connolly and Hutz

[57] ABSTRACT

The invention relates to thermoplastic molding compositions of PVC and (ter)polymers which can optionally be grafted on to a resin and are suitable for the production of optical discs by virtue of their extremely low double refraction.

4 Claims, No Drawings

MOULDING COMPOSITIONS OF LOW DOUBLE REFRACTION

This application is a continuation of application Ser. No. 07/436,114 filed Nov. 13, 1989, now abandoned, which is a continuation of application Ser. No. 205,734, filed Jun. 13, 1988, now abandoned.

This invention relates to thermoplastic molding compositions of PVC and (ter)polymers which can optionally be grafted on to a resin and which are suitable for the production of optical discs by virtue of their extremely low double refraction.

Thermoplastic molding compositions based on PVC with resin properties, which have a lower double refraction than PVC itself, have hitherto been unknown.

It is known that, by virtue of their transparency, polycarbonate (PC), polymethyl methacrylate (PMMA), polystyrene (PS), glass and pure PVC are suitable in principle for the production of optical discs. However, all hitherto known systems are attended by disadvantages, in some cases serious disadvantages. Polycarbonate has problems in its double refraction behavior and scratch resistance, PMMA shows excess water uptake, PS is problematical in regard to its double refraction behavior and resistance to solvents, glass shows inadequate mechanical strength, is difficult to process and is too expensive.

Apart from its unfavorable deflection temperature under load, pur PVC is only average in its properties so that it has not hitherto been used.

It has now been found that PVC can be modified with certain (ter)polymers which can optionally be grafted on to a resin, to form transparent, high-impact thermoplastic molding compositions which are free from stress cracking and which show extremely low double refraction and an adequate deflection temperature under load.

Accordingly, the present invention relates to thermoplastic molding compositions having extremely low double refraction of mixtures of

A. PVC,

B. a (ter)polymer of vinyl monomers, such as styrene, α-methyl styrene, acrylonitrile and methyl methacrylate etc. which C. can optionally be grafted on to a rubber phase from the series of diene or diene copolymerization rubbers.

The present invention also relates to the use of these molding compositions for the production of optical discs.

If the moulding compositions according to the invention consist only of components A and B, then the latter preferably contain:

A) 30–70% by weight of PVC and

B) 70–30% by weight of a thermoplastic polymerisation resin consisting of 30–40% by weight of α-methylstyrene, 52–62% by weight of methyl methacrylate and 4–14% by weight of acrylonitrile.

According to the invention, preferred molding compositions consist of 30 to 70% PVC and 70 to 30% of component B and/or C).

If component C is used as a mixing constituent it consists of

I. 95 to 15% by weight (based on graft product) of a mixture of 30 to 40 parts by weight α-methyl styrene, 52 to 62 parts by weight methyl methacrylate and 4 to 14 parts by weight acrylonitrile on II. 5 to 85% by weight (based on graft product) of a rubber having a particle diameter ($d_{50}$) of 50 to 1000 nm of 0 to 40% by weight copolymerized styrene or acrylonitrile and 100 to 60% by weight copolymerized butadiene or $C_1$-$C_6$ alkyl acrylate.

The graft polymer C is preferably a rubber of 28 to 40% by weight copolymerized styrene or acrylonitrile and 72 to 60% by weight copolymerized butadiene or $C_1$-$C_6$ alkyl acrylate.

A modifier of the type typically used for PVC may be added to the molding compositions according to the invention, for example to improve their mechanical properties or their deflection temperature under load etc. Flow aids, flameproofing agents, stabilizers, bluing agents, pigments etc. may also be added.

According to the invention, the PVC component may be any commercially available PVC, preferably having a K-value of 30 to 100.

The production of a thermoplastic polymerisation resin which can be used according to the invention is described for example in DE-OS 3,424,894.

Additional resin components or modifiers such as MBS (methyl methacrylate/butadiene/styrene copolymer) are known products. Such MBS modifiers are graft polymers on rubbers; the rubbers suitable for the production of the graft polymers are particulate having average particle sizes ($d_{50}$) of 0.08–0.3 μm and are partially crosslinked and have gel contents of >50% by weight, in particular 70 to 95% by weight, based on the rubber.

The compositions according to the invention can be compounded in the mixing units normally used in PVC technology, the molding compositions may be produced by rolling, molding, extrusion, injection molding or other standard methods at temperatures of fro example 150°–220° C.

The compositions according to the invention can for example be used for the production of optical discs, for example for the production of compact discs.

EXAMPLES

Molding Compositions of Components A+B

The molding compositions were produced with the following formulations and processing conditions:

1. Polymers according to the invention, consisting of a terpolymer of 55,5% by weight of methyl methacrylate, 34,5% by weight of α-methylstyrene and 10% by weight of acrylonitrile (named MSAN in the examples), with a Staudinger index of 0.4, measured in DMF at 23° C.

2. Molded plates are produced at 190° C. with a molding time of 12 min. from a mixture of the following formulation homogenised on mixing rolls for 10 minutes at 185° C.

In order to determine the double refraction the optical anisotropy of a rectangular specimen produced from the molding compositions according to the invention was measured in nm/mm in the three directions in space M1, M2 and M3. An ideal specimen would display a value of 0 nm/mm in each of the three directions in space M1, M2 and M3. The formulations according to the invention provide specimens which display a double refraction in the three directions in space M1, M2 and M3 which is in each case a comparable order of magnitude.

TABLE 1

| Formulation No. | 1* | 2 | 3 | 4 | 5 | |
|---|---|---|---|---|---|---|
| Vestolit ® M 5867 | 100 | 50 | 50 | 50 | 50 | parts by weight |
| MSAN | — | 50 | 40 | 50 | 40 | " |
| Irgastab ® T 22 M | 1,5 | 1,5 | 1,5 | 1,5 | 1,5 | " |
| Loxiol ® G 70 | 0,3 | 0,3 | 0,3 | 0,5 | 0,5 | " |
| Loxiol ® G 72 | — | — | — | 1 | 1 | " |

Vestolit ® M 5867: bulk PVC (K-value 58)
Irgastab ® T 22 M: butyl tin mercaptide stabilizer,
Loxiol ® G 70: high molecular weight fatty acid ester,
Loxiol ® G 72: high molecular weight fatty acid ester
MABS: polymers according to the invention
*for comparison, formulation of an unmodified PVC molding composition

TABLE 2

| | | Optical Properties | | | | | | |
|---|---|---|---|---|---|---|---|---|
| | | | Formulations | | | | | Test |
| | Units | Polycarbonate[1] | 1 | 2 | 3 | 4 | 5 | specifications |
| Degree of transmission | | | | | | | | |
| at 550 nm | % | 90,9 | 89,5 | 88,5 | 89,2 | 68,1 | 63,0 | DIN 5036 |
| at 800 nm | % | 91,5 | 91,2 | 91,4 | 91,6 | 83,9 | 77,5 | |
| Yellow value G | | 2,3 | 6,5 | 8,1 | 7,8 | 21,3 | 22,3 | DIN 6167 |
| Double refraction[2] | | | | | | | | |
| M1 | nm/mm | 8 | 80 | 5 | 5 | 0 | −21 | |
| M2 | nm/mm | 527 | 165 | 45 | 20 | 45 | 43 | |
| M3 | nm/mm | −539 | −91 | −32 | −7 | −45 | −25 | |

[1]Polycaronate = compact disc plate; formulations 1-6 = molded plates
[2]Polycarbonate = molded plate (240° C., 12 min.; granulate predried in vacuo for 4 h at 120° C.); M1, M2, M3 directions of test specimen in space during determination of the optical anisotropy of this specimen.

TABLE 3

| | | Mechanical and thermal properties | | | | |
|---|---|---|---|---|---|---|
| | Units | Polycarbonate | 1 | 3 | 5 | Test specifications |
| Tear resistance | N/mm² | 55 | 46 | 65 | 59 | DIN 53455 |
| Yield point | N/mm² | 60 | 57 | 64 | 69 | DIN 53455 |
| Notched impact strength 23° C. | kJ/m² | 17 | 3 | 4 | 3 | DIN 53453 |
| Ball indentation hardness H 30 | n/mm² | 112 | 129 | 107 | 154 | DIN 53456 |
| Vicat VST/B/120 | °C. | 141 | 82 | 96 | 93 | DIN 53460 |

EXAMPLES

Molding Compositions of Components A, B or C

The molding compositions were prepared using the following formulations and processing conditions:

1. Polymers according to the invention (referred to as MABS in the Examples) consist of 20% by weight of a rubber and 80% by weight of a terpolymer resin. The rubber consists of 65% by weight butadiene and 35% by weight styrene while the termpolymer consists of 55.5% by weight methyl methacrylate, 34.5% by weight (α-methyl styrene and 20% by weight acrylonitrile. Molded plates are produces at 190° C. (molding time 12 minutes) from the following mixtures homogenized on mixing rolls for 10 minutes at 185° C.:

TABLE 4

| Formulation no. | 1* | 2 | 3 | 4 | 5 | |
|---|---|---|---|---|---|---|
| Vestolit ® M 5867 | 100 | 50 | 50 | 50 | 50 | parts by weight |
| MABS | — | 50 | 40 | 50 | 40 | parts by weight |
| Kane ® A CE B 22 | — | — | 10 | 0 | 10 | parts by weight |
| Irgastab ® T 22 M | 1.5 | 1.5 | 1.5 | 1.5 | 1.5 | parts by weight |
| Loxiol ® G 70 | 0.3 | 0.3 | 0.3 | 0.5 | 0.5 | part by weight |
| Loxiol ® G 72 | — | — | — | 1 | 1 | part by weight |

Vestolit ® M 5867: bulk PVC (K value 58)
MBS, e.g. Kane ACE B 22
Irgastab ® T 22 M: butyl tin mercaptide stabilizer
Loxiol ® G 70: high molecular weight fatty acid ester
Loxiol ® G 72: high molecular weight fatty acid ester
MABS: polymers according to the invention
*For comparison, formulation of an unmodified PVC molding composition The following Tables demonstrate the particular suitability of the compositions or graft products according to the invention as components in PVC molding compositions of extremely low double refraction.

TABLE 5

| | | Optical properties | | | | | | |
|---|---|---|---|---|---|---|---|---|
| | | | Formulations | | | | | Test- |
| | Units | Polycarbonate[1] | 1 | 2 | 3 | 4 | 5 | specifications |
| Degree of transmission | | | | | | | | |
| at 550 nm | % | 90.9 | 89.5 | 89.2 | 88.1 | 86.8 | 85.7 | DIN 5036 |
| at 550 nm | % | 91.5 | 91.2 | 91.5 | 91.4 | 91.9 | 90.5 | |
| Scattered light[2] | cd/m² (Lx) | 0.44 | 1.7 | 1.9 | 1.1 | 1.8 | 1.2 | DIN 4646 |
| Yellow value | | 2.3 | 6.5 | 10 | 10.6 | 10.7 | 11.4 | DIN 6167 |
| Double refraction[3] | | | | | | | | |
| M1 | nm/mm | 8 | 80 | 0 | 4 | 5 | 7 | |
| M2 | nm/mm | 527 | 165 | 18 | 16 | 15 | 11 | |
| M3 | nm/mm | −539 | −91 | −19 | −13 | −6 | −2 | |

[1]Polycarbonate = Compact disc plate; formulations 1-5 = molded plates ;
[2]Measured vertically through the plate; with narrow aperture angle of light source
[3]Polycarbonate = molded plate (240° C., 12 mins.; granulate predried in vacuo for 4 h at 120° C.); M1, M2, M3 directions of test specimen in space during determination of the optical anisotropy of the test specimen.

TABLE 6

| | | Mechanical and thermal properties | | | | | | |
|---|---|---|---|---|---|---|---|---|
| | Units | Polycarbonate | 1 | 2 | 3 | 4 | 5 | Test specifications |
| Ultimate strength | N/mm$^2$ | 55 | 46 | 36 | 32 | 34 | 31 | DIN 53455 |
| Yield point | N/mm$^2$ | 60 | 57 | 53 | 45 | 51 | 42 | DIN 53455 |
| Notched impact strength 23° C. | kJ/m$^2$ | 17 | 3 | 4 | 12 | 4 | 16 | DIN 53453 |
| Izod notched impact strength 23° C. | J/m | 600 | 58 | 49 | 170 | 52 | 506 | ASTM D 256 |
| Impact strength | | | | | | | | |
| 23° C. | kJ/m$^2$ | x | x | x | x | x | x | DIN 53453 |
| 0° C. | kJ/m$^2$ | x | x | 5/10 = 99[a] | x | 4/10 = 65[b] | x | |
| Ball indentation hardness H30 | n/mm$^2$ | 112 | 129 | 105 | 92 | 100 | 83 | DIN 53456 |
| Vicat VST/B/120 | °C. | 141 | 82 | 91 | 87 | 91 | 84 | DIN 53460 |

[a] 5 out of 10 test specimens broken, mean value 99 J/M$^2$
[b] 4 out of 10 test specimens broken, mean value 65 J/m$^2$
x = unbroken

We claim:

1. Thermoplastic moulding compositions of extremely low double refraction and a transmittance from 85.7% to 89.2% at 550 nm consisting essentially of mixtures of
   A. PVC
   B. a (ter)polymer of vinyl monomers produced by the polymerization of a mixture of monomers comprising styrene, α-methyl styrene, acrylonitrile and methyl methacrylate which
   C. is grafted on to a rubber phase consisting essentially of diene rubbers.

2. Thermoplastic moulding compositions of extremely low double refraction and a transmittance from 85.7% to 89.2% at 550 nm consisting essentially of mixtures of 30-70% by weight of PVC and 95-15% by weight (based on the graft product) of a mixture of 30 to 40 parts by weight α-methyl styrene, 52 to 62 parts by weight methyl methacrylate and 4 to 14 parts by weight acrylonitrile grafted on 5 to 85% by weight (based on graft product) of a rubber having a particle diameter ($d_{50}$) of 50 to 1000 nm of 0 to 40% by weight copolymerized styrene or acrylonitrile and 100 to 60% by weight copolymerized butadiene or $C_1$-$C_6$ alkyl acrylate.

3. A composition according to claim 2 wherein said rubber consisting essentially of 28 to 40% by weight copolymerized styrene or acrylonitrile and 72 to 60% by weight copolymerized butadiene or $C_1$-$C_6$ alkyl acrylate.

4. A composition according to claim 2 wherein said rubber comprises copolymerized styrene and $C_1$-$C_6$ alkyl acrylate.

* * * * *